Oct. 23, 1956 E. T. A. PHILLIPS ET AL 2,768,309

METHODS OF PROVIDING A MODULATED CARRIER SIGNAL

Filed March 24, 1952 3 Sheets-Sheet 1

Inventors
E. T. A. Phillips
H. G. C. Botting
By Glascock Downing & Seebold
Attys.

METHODS OF PROVIDING A MODULATED CARRIER SIGNAL

Filed March 24, 1952 3 Sheets-Sheet 2

Inventors
E. T. A. Phillips
H. G. C. Botting
By Gascock Downing & Seebold
Attys.

METHODS OF PROVIDING A MODULATED CARRIER SIGNAL

Filed March 24, 1952 3 Sheets-Sheet 3

Inventors
E. T. A. Phillips
H. G. C. Botting
By Glascock Downing & Seebold
Attys.

United States Patent Office 2,768,309

Patented Oct. 23, 1956

2,768,309

METHODS OF PROVIDING A MODULATED CARRIER SIGNAL

Eric Thomas Arthur Phillips and Henry George Charles Botting, Beckenham, England, assignors to Muirhead & Co. Limited, Beckenham, England Application March 24, 1952, Serial No. 278,288

Claims priority, application Great Britain April 12, 1951

5 Claims. (Cl. 250—209)

This invention relates to methods of providing a modulated carrier signal from a scanning or like signal.

It is well known that the customary methods of providing a modulated carrier signal from a scanning signal for facsimile transmission is by mechanically interrupting the light of the scanning signal incident upon a photo-electric cell (for example, by chopper disc). The chopper disc method is subject to two primary disadvantages.

The first of these disadvantages is that modulation of the interruption frequency is possible to a fundamental picture-element frequency of half the interruption frequency only. The reason for this is that with a chopping system light falls upon the photo-cell for part of the time only. Therefore, in order that a change in light intensity may be recognised, there must be at least two cycles of the interruption frequency.

It is an object of the invention to eliminate this disadvantage.

The invention consists of an arrangement for providing a modulated carrier signal in which the carrier signal is applied between a pair of electrodes of a multi-stage photo-electric multiplier cell.

The carrier signal is conveniently applied between the cathode and first dynode of the cell.

The first dynode is biassed to give operation in the range of maximum cathode sensitivity and to give a cell sensitivity of approximately 50% of maximum.

The second disadvantage is that the picture intelligence is represented simultaneously by two groups of frequencies in the photo-cell output current. One of these groups is generated as the result of modulation of the interruption frequency by the picture-element frequency. This modulation produces "sidebands" above and below the interruption frequency. The other group consists of the picture-element frequencies in original form—produced as the average value of unidirectional current in the photo-cell. The limits to which these two frequency groups extend are dependent upon the degree of resolution of the optical scanning system and the rate of scanning of the picture elements.

When the upper limit of the picture-element frequency is of the same order as the interruption frequency, it is not practicable to remove the low-frequency group without disturbing the amplitude relationship between components in the higher-frequency group.

Were both these groups transmitted through a communication channel to the receiver, considerable distortion would result from the effects of the differential time delay in the channel upon the two frequency groups representing, as they do, a common picture-element.

It is an object of the invention to eliminate this disadvantage.

The invention further consists of an arrangement for providing a modulated carrier signal in which the carrier signal is applied in anti-phase to a push-pull arrangement of multi-stage photo-electric multiplier cells.

When using push-pull arranged multi-stage photo-electric multiplier cells the carrier may be applied in anti-phase across the two first dynodes, or alternatively, the carrier signal may be applied in anti-phase across the two cathodes.

The invention will be further described with reference to the accompanying drawings.

The lower group of frequencies will hereinafter be referred to as the "direct current component."

Figures 1, 2:
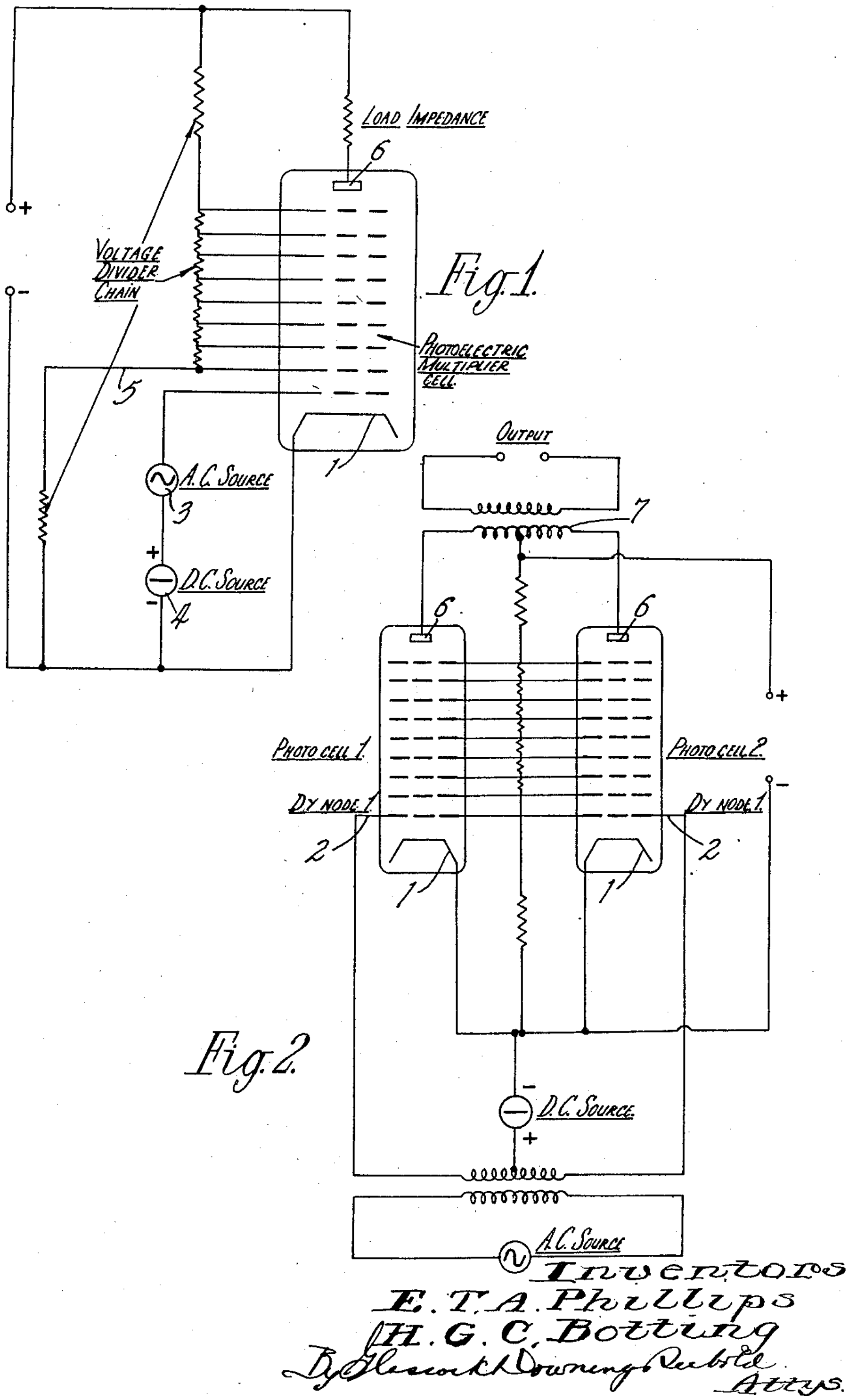
Figure 1 is a circuit diagram of one arrangement in accordance with the invention.
Figure 2 is a circuit diagram of a further arrangement in accordance with the invention.

In Figure 1 is shown a circuit which employs a photo-electric cell of the above type which has the first (nearest-the-cathode 1) multiplying electrode 2 (herein termed the first dynode), connected to a source of alternating current 3 superimposed upon a source of direct current potential 4. The value of the direct current potential in relation to the potential on the second dynode 5 is sufficient to give the cell a sensitivity of approximately 50% of maximum. The applied alternating current gives the cell a total instantaneous sensitivity either above or below that obtained with the direct current alone according to the instantaneous value of the alternating current.

Thus a sensitivity characteristic proportional to the applied alternating current is obtained for the cell, and an output current of alternating form—and of value proportional to the intensity of the incident light is obtainable from the anode 6.

In detail the operation of the system is as follows.

If the direct current polarising voltage on the first dynode 1 be maintained above a certain saturation level, then the initial cathode sensitivity of the cell will become independent of the dynode voltage. This is fundamental to all types of vacuum photo-electric cells and results from the collection—at the critical voltage—by the positively polarised electrode—of all photo-electrons emitted by the cathode at any particular level of light intensity. Consequently, if the operating point be correctly chosen, a variation on either side of the direct current potential of the first dynode will produce no change in the cathode sensitivity, unless the variations reduce the dynode potential below the saturation point. If, at the same time, the other dynodes in the multiplier chain be maintained at potentials of ascending order towards the anode, a reduction in the potential of the first dynode will result in an increase of total cell sensitivity due to the increased potential gradient between the first dynode and that succeeding it. By similar argument it can be seen that an increase in the first dynode potential will result in a decrease in total cell sensitivity.

Thus an output current can be derived from the anode of the cell which contains a component similar in form to the alternating current applied to the first dynode, and which is proportional in value to the intensity of light incident upon the cathode, as stated earlier.

From the foregoing it is clear that the output current is flowing continuously and can respond instantaneously in sympathy with light fluctuations, and that the system imposes no practical limit on the frequency of such fluctuations, as is inherent in systems employing interrupted light. The direct current component is still present in the output current.

In the case where it is desired that the carried frequency shall be of the same order as the modulation frequency produced by the material to be scanned, then the second disadvantage mentioned above can be overcome using two cells connected differentially in a system as described above and shown in Figure 2.

In this circuit, the first dynode 2 of each cell is connected to a source of direct current as previously. The alternating current source is connected to the dynodes in such a manner that at any instant the phase relation between the voltages on the aforesaid dynodes is 180°, that is, the dynodes are in anti-phase. In this way, the cells behave as two valves in push-pull connection, the total light sensitivity of the system being twice that of a single cell.

The output current is drawn through a balanced coupling from the anodes 6 of the cells (for example, a centre-tapped transformer 7) and, in consequence, does not contain the direct component of current due to light variation—the direct current component.

Figures 3, 4:
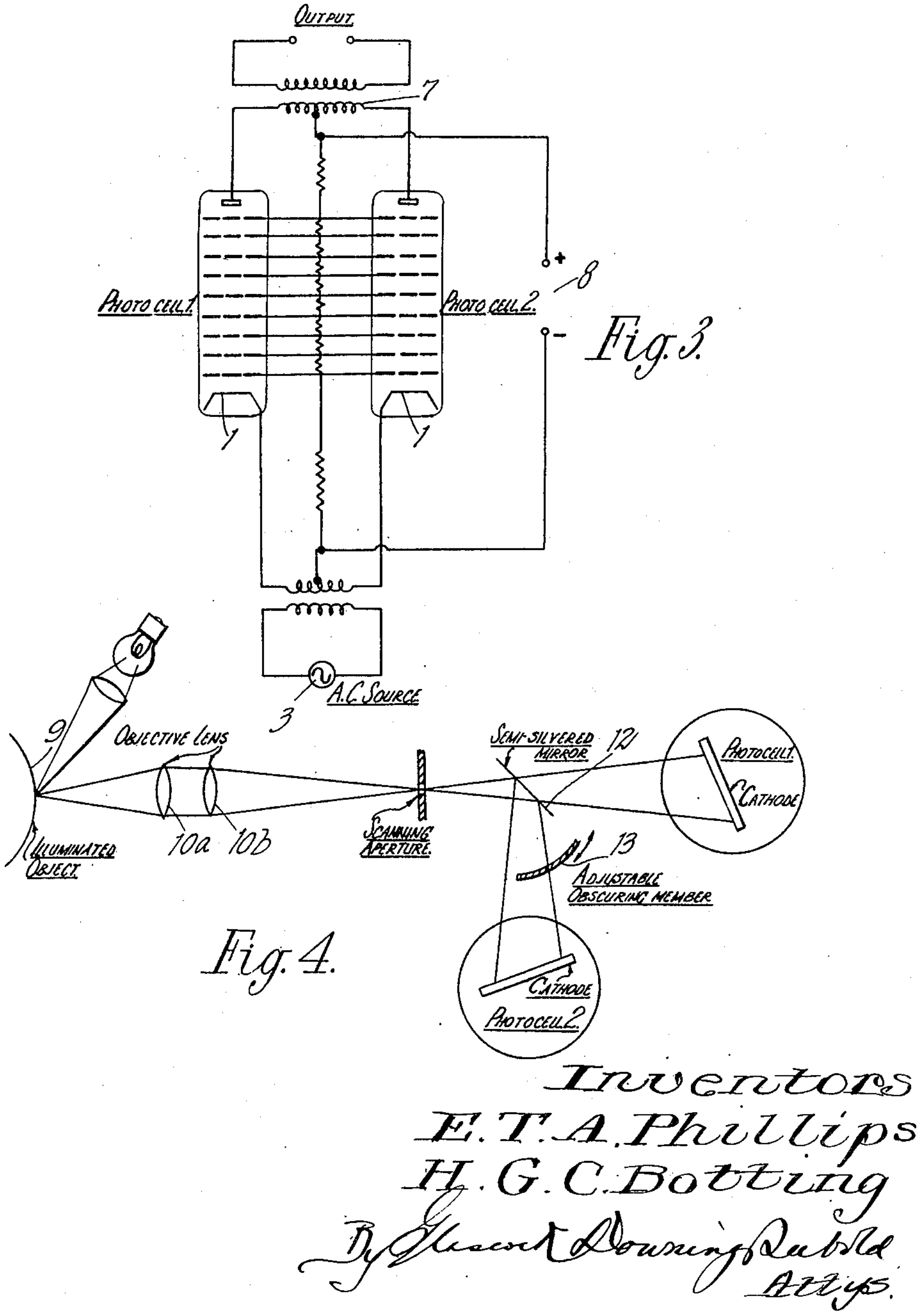
Figure 3 is a circuit diagram of a still further arrangement in accordance with the invention.
Figure 4 is a diagram showing a possible optical layout.

Alternatively, when a double cell system is to be used, the electrical connections may be made as in Figure 3. In this circuit arrangement the multiplying electrodes are connected in a normal manner to a source of direct current voltage 8, and the cathodes 1 of the two cells have the carrier frequency from source 3 alternating current superimposed upon them in such a manner that in addition to the cathode to dynode potential provided by the stepping chain, the voltage of each cathode varies periodically at the carrier frequency with respect to the first dynode in the same cell, and that the two cathodes are in anti-phase.

In this circuit arrangement the cells are operated within that region of cathode current which lies below the saturation point. Each cathode alternately moves in potential either towards or away from its first dynode. As the cathode potential approaches that of the first dynode, the sensitivity increases until the saturation point is reached. Thus a half-wave rectification effect is produced in each cell, a change of current occurring only during that part of the cycle when the cathode-dynode potential lies in the region below the saturation point. The distortion thus produced in the output current wave form is minimised by the differential connection of the two cells, but some distortion still remains as the result of the non-linear sensitivity-versus-light characteristic of the cells when used under these conditions.

If the distortion produced by the above system can be tolerated, in addition to the lower modulation efficiency, the scheme offers an advantage over that discussed earlier, in that it does not require the provision of a direct current source at high potential with respect to the cell anode circuit, which latter is normally arranged for convenience, to be at near-earth potential.

The optical system used with these double-cell systems may contain a means for distributing the light between the cells in such a manner as to produce currents of equal magnitude in the two cells for the same common light intensity. An example of such an arrangement is shown in Figure 4 wherein light from an illuminated object 9 is passed through objective lenses 10*a*, 10*b*, and a scanning aperture 11 to a half-silvered mirror 12 which is indicated as a means of splitting the light into two paths; one path being through the mirror by direct transmission, the other by reflection from the surface of the mirror. The light then falls on the photocell 1 or the photocell 2 as shown. The relative amount of light falling on each cell may be controlled by adjusting the angular position of the mirror with relation to the axis of the light beam. Alternatively an opaque or semi-opaque member 13 may be introduced by adjustment into the path of either beam to obtain balance.

To accommodate pairs of cells with unequal sensitivities, electrical balancing arrangements may be incorporated in the output circuit of the photoelectric cells.

The illuminated object 9 will be the drum of a facsimile transmitter.

Figures 5, 6:
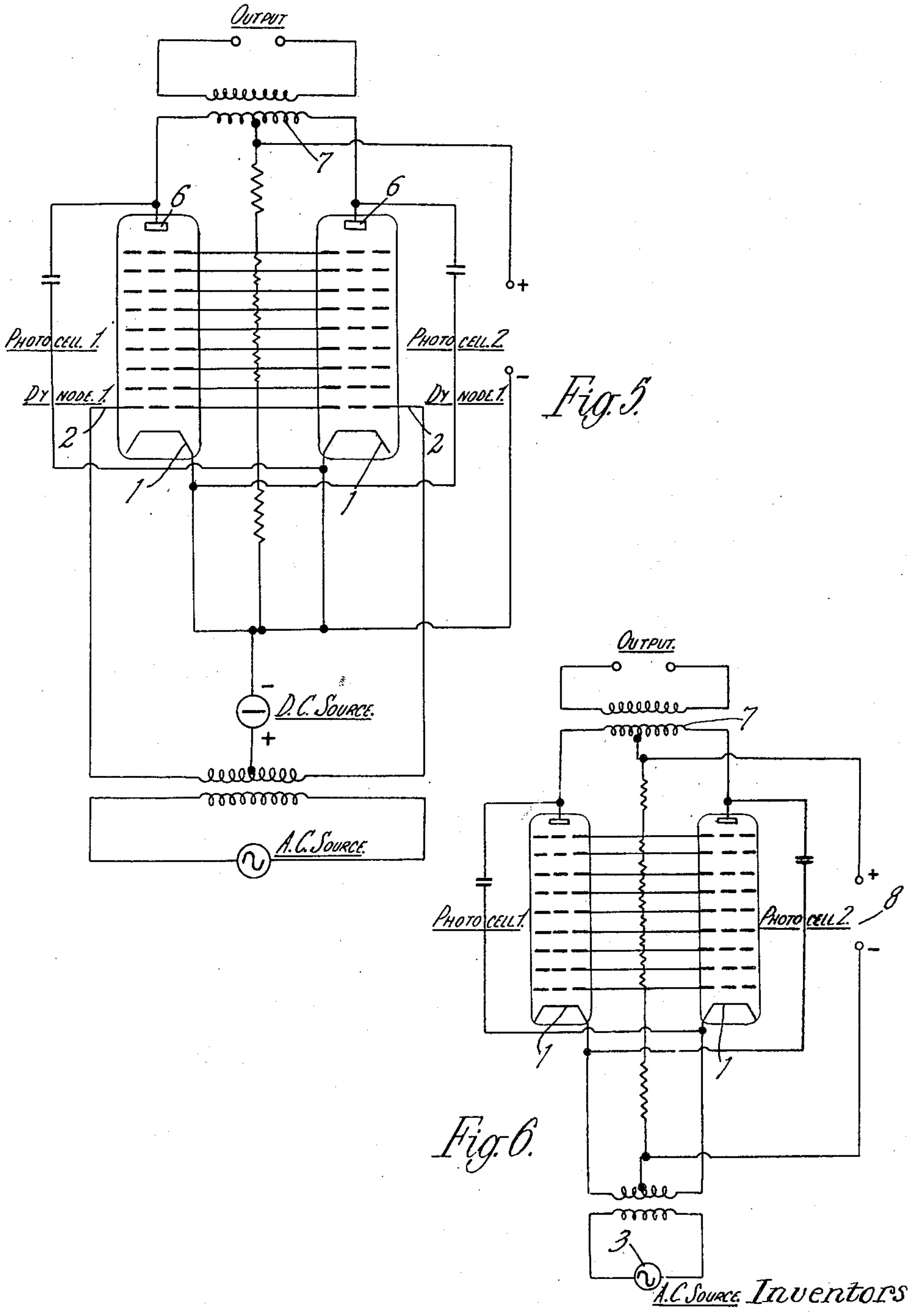
Figures 5 and 6 show modifications of Figures 2 and 3 respectively.

Small neutralising capacitors may be added as shown in Figures 5 and 6 between anodes and cathodes to preserve electrical balance of the system at high frequencies.

Various modifications may be made within the scope of the invention.

We claim:

1. An arrangement for providing a modulated carrier signal from a scanning or like signal comprising a pair of photoelectric multiplier cells each having an anode, a cathode and a dynode, connecting means for energizing the pair of photoelectric multiplier cells in a push-pull connection above saturation level, connecting means for applying the output of a source of alternating current to the dynodes of the two cells in antiphase and between the cathodes of each cell and its respective dynode and connecting means for supplying an output from the two cells in the form of a carrier signal modulated in accordance with the intensity of light incident in equal intensity on the respective cathodes of the two cells.

2. An arrangement as claimed in claim 1, in which small neutralising capacitors are connected respectively between the anode of one cell and the cathode of the other cell and between the cathode of said one cell and the anode of said other cell to preserve electrical balance of the system at high frequencies.

3. An arrangement as claimed in claim 1, comprising direct current biasing means connected between the cathodes and the dynodes of the cells to give the cells a sensitivity of approximately 50% maximum.

4. An arrangement for providing a modulated carrier signal from a scanning or like signal comprising a pair of photoelectric multiplier cells each having an anode, a cathode and a dynode, connecting means for energising the pair of photoelectric multiplier cells in a push-pull connection below the saturation point, connecting means for applying the output of a source of alternating current to the cells in antiphase across the respective cathodes of the two cells, and between the cathode of each cell and its respective dynode and connecting means for supplying an output from the two cells in push-pull.

5. An arrangement as described in claim 4, in which small neutralising capacitors are connected respectively between the anode of one cell and the cathode of the other cell and between the cathode of said one cell and the anode of said other cell to preserve electrical balance of the system at high frequencies.

References Cited in the file of this patent

UNITED STATES PATENTS

| | | |
|---|---|---|
| 2,290,775 | Snyder | July 21, 1942 |
| 2,298,466 | Cooley | Oct. 13, 1942 |
| 2,342,986 | Van Den Bosch | Feb. 29, 1944 |
| 2,430,095 | Asten | Nov. 4, 1947 |
| 2,430,146 | Shonnard | Nov. 4, 1947 |
| 2,454,871 | Gunderson | Nov. 30, 1948 |
| 2,565,265 | Peterson | Aug. 21, 1951 |
| 2,707,238 | Fromm | Apr. 26, 1955 |